United States Patent [19]
Tanaka

[11] Patent Number: 5,724,730
[45] Date of Patent: Mar. 10, 1998

[54] METHOD OF PROTECTING CONDUCTIVE PART OF FLAT CABLE

[75] Inventor: Yoshiyuki Tanaka, Shizuoka-ken, Japan

[73] Assignee: Yazaki Corporation, Tokyo, Japan

[21] Appl. No.: 598,834

[22] Filed: Feb. 9, 1996

[30] Foreign Application Priority Data

Feb. 16, 1995 [JP] Japan .................. 7-027976

[51] Int. Cl.[6] .................. H01R 43/24; H01R 43/02
[52] U.S. Cl. .................. 29/868; 29/856; 29/858; 29/860; 174/76; 264/272.14; 264/272.15
[58] Field of Search .................. 29/858, 860, 868, 29/872, 856; 174/76; 264/272.11, 272.14, 272.15

[56] References Cited

U.S. PATENT DOCUMENTS

| | | | |
|---|---|---|---|
| 3,444,618 | 5/1969 | Sorlie | 29/858 |
| 3,650,024 | 3/1972 | Finney | 29/858 X |
| 3,831,271 | 8/1974 | Pedler | 29/858 |
| 3,978,581 | 9/1976 | Miura | 29/858 |
| 4,395,375 | 7/1983 | Ferris et al. | 29/856 X |
| 4,574,474 | 3/1986 | Langhan | 29/858 |
| 4,710,593 | 12/1987 | Hall, Jr. et al. | 29/868 X |
| 4,949,454 | 8/1990 | Schauer et al. | 29/860 |

FOREIGN PATENT DOCUMENTS

| | | | |
|---|---|---|---|
| 3623927 | 10/1987 | Germany | 29/858 |
| 56-18615 | 2/1981 | Japan. | |

*Primary Examiner*—Peter Vo
*Attorney, Agent, or Firm*—Wigman, Cohen, Leitner & Myers, P.C.

[57] ABSTRACT

A method of protecting a conductive connecting part of a flat cable and a protecting structure of the cable are provided. The method includes a step of connecting conductors of the flat cable to conductors of relay wires at the conductive connecting part, a step of arranging a protective member at the exterior of an insulating cover part of the flat cable, a step of interposing the protective member between opposing molding dies and accommodating the conductive connecting part of the flat cable in a cavity defined by the molding dies in a leak-tight manner, and a step of supplying insulating material in the cavity for an insert molding. The protecting structure includes the conductive connecting part, the protective member and the insulating member for enclosing the conductive connecting part together with a leading end of the protective member. The insulating member is formed by insert molding. Since the cover part is not held by the mold directly, but is held through the intermediary of the protective member in forming the conductive connecting part, it is possible to moderate a force applied on the conductors by the aid of the protective member without increasing a thickness of the cover part of the flat cable, so that the breaking of the conductors can be prevented with certainty.

6 Claims, 2 Drawing Sheets

METHOD OF PROTECTING CONDUCTIVE PART OF FLAT CABLE

BACKGROUND OF THE INVENTION

The present invention relates to a method of protecting a conductive connecting part of a flat cable and a protecting structure for protecting the conductive connecting part of the flat cable.

Hitherto, in order to electrically connect a movable member, such as a shaft of a steering wheel of an automobile etc., to an immovable member (e.g. a steering column of the automobile), there is known a method of connecting the movable member to the immovable member by use of a flexible flat cable having a plurality of conductors. Note, the flexible flat cable will be referred as "flat cable", hereinafter.

When it is required to connect the above flat cable to a connector arranged in the movable member or the immovable member, each conductor on an end of the flat cable is connected to each conductor of relay wires on one end thereof at first. Each of the relay wires is provided on the other end with a terminal metal crimped thereto, so that the terminal metal is inserted into a connector housing or the like. In this way, the flat cable is connected to the connector through the intermediary of the relay wires.

Hereto, for the purpose of protecting a conductive connecting part (area) at which the conductors of the flat cable are connected to conductors of the relay wires and in order to ensure a tensile strength of the flat cable, a method of protecting the conductive connecting part and a structure for protecting the part are disclosed in Japanese Unexamined Utility Model publication No. 56-18615. In the structure, the conductive connecting part is covered with an insulating member formed by a so-called "insert" molding process.

We now describe the above protecting method in brief.

First of all, the conductors exposed from a cover part of the flat cable are connected to the conductors exposed from cover parts of the relay wires at the conductive connecting part by welding.

Next, the conductive connecting part, which consists of the respective exposed conductors of the cable and the relay wires, is accommodated in a cavity of a mold consisting of an upper molding die and a lower molding die and thereafter, the insulating member (insulating material) is supplied into the cavity of the mold by the insert molding. In this way, the conductive connecting part can be covered with the insulating member and the tensile strength of the cable can be increased.

In the above mentioned protecting method and structure, however, it is necessary that, at the insert molding, the cavity of the mold be brought into a leak-tight condition by applying an intensive pressure on the mold from the upper and lower sides while interposing the flat cable between one end of the upper molding die and one end of the lower molding die. Therefore, there is a problem in that, due to a pressure when clamping the mold, an excessive shear force is applied on the flat cable, so that the conductors of the flat cable may be broken in the cover part, thereby causing the stability of conductivity to be deteriorated.

It may be expected that such a problem can be solved by increasing a thickness of the cover part in the flat cable. However, the increase in thickness of the cover part incurs a decrease in flexibility of the flat cable thereby reducing the movability of the cable with its increased resistance. In addition, the increasing of the thickness causes the flat cable per se to be large-sized undesirably.

SUMMARY OF THE INVENTION

It is therefore an object of the present invention to provide a method of protecting a conductive connecting part of a flat cable and a protecting structure thereof, by which the tensile strength of the flat cable can be increased without vitiating the performance of the cable and the stable connecting form can be realized between conductors of the flat cable and conductors of relay wires.

The above object of the invention can be accomplished by a method of protecting a conductive connecting part of a flat cable, at which the flat cable is electrically connected to an object, the flat cable consisting of a conductor and an insulating cover part for enveloping the conductor, the object including another conductor to be connected to the conductor of the flat cable, the method comprising the steps of:

connecting the conductor exposed from the insulating cover part of the flat cable to the conductor of the object at the conductive connecting part;

arranging a protective member at the exterior of the insulating cover part in the direction of thickness thereof;

interposing the protective member between opposing molding dies in the direction of thickness, and accommodating the conductive connecting part of the flat cable in a cavity defined by the molding dies, in a leak-tight manner; and supplying insulating material in the cavity for an insert molding thereby insert-molding an insulating member for enclosing the conductive connecting part.

According to the present invention, there is also provided a structure for protecting a flat cable to be electrically connected to an object, the flat cable consisting of a conductor and an insulating cover part for enveloping the conductor, the object including another conductor to be connected to the conductor of the flat cable, the structure comprising:

a conductive connecting part at which the conductor exposed from the insulating cover part of the flat cable is connected to the another conductor of the object;

a protective member arranged at the exterior of the insulating cover part of the flat cable in the direction of thickness thereof; and an insulating member for enclosing the conductive connecting part together with a leading end of the protective member, the insulating member being formed by insert molding.

In the above method and structure, the cover part is not held by the mold directly but held through the intermediary of the protective member in forming the conductive connecting part (i.e., the insert molding of the insulating member). Thus, it is possible to moderate a force applied on the conductors by the aid of the protective member without increasing a thickness of the cover part of the flat cable, so that the breaking (disconnection) of the conductors caused by an excessive shearing force in molding can be prevented certainly. In other words, it is possible to thin the cover part of the flat cable for the improvement in movability of the flat cable and the prevention of being large-sized, and to stabilize the connecting form of the flat cable.

In the above method of the invention, preferably, the conductor of the flat cable is connected to the conductor of the object by welding in the connecting step.

More preferably, the protective member is made of resinous material exhibiting either one of elasticity and flexibility.

3

It is also preferable that the insulating material is either one of thermoplastic resinous material and thermosetting resinous material.

In the above method of the invention, preferably, each of the molding dies is provided on both sides of the cavity with a recess for holding the protective member and a groove for holding the object, respectively.

More preferably, each of the molding dies is provided adjacent to the recess with another recess for passing the insulating cover part of the flat cable therethrough.

These and other objects and features of the present invention will become more fully apparent from the following description and appended claims taken in conjunction with the accompany drawing.

DESCRIPTION OF THE PREFERRED EMBODIMENT

Figure 1:
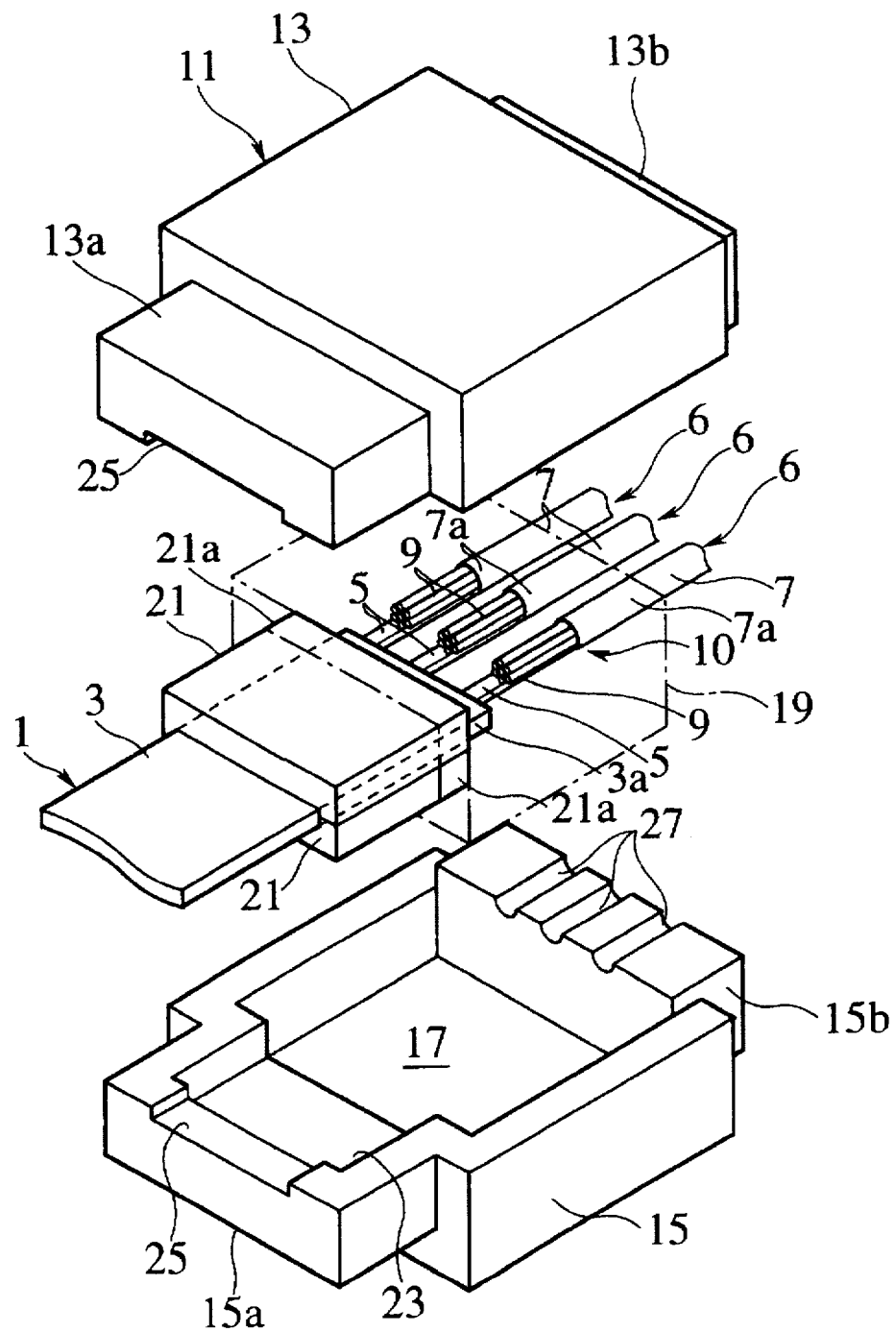
FIG. 1 is a perspective view of a protective structure in accordance with an embodiment of the present invention.
Figure 2A:
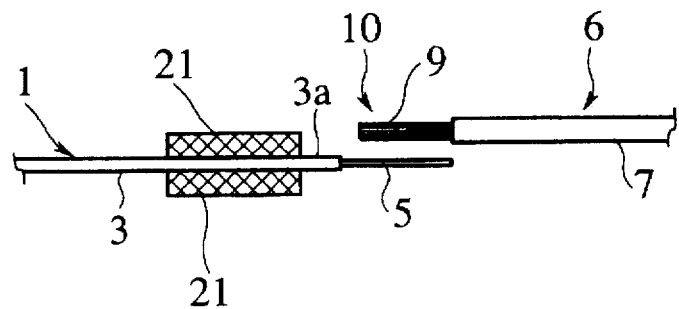
FIG. 2A is a lateral cross sectional view of the structure of FIG. 1, showing a condition of the structure before conductors of a flat cable are connected to conductors of relay wires.
Figure 2B:
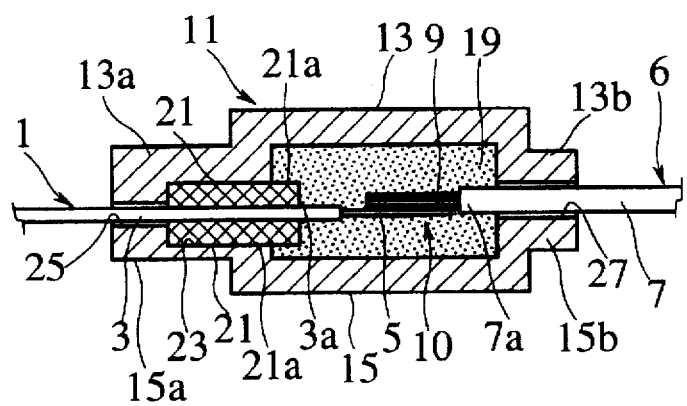
FIG. 2B is a lateral cross sectional view of the structure of FIG. 1, showing a condition of the structure during insert molding.
Figure 2C:
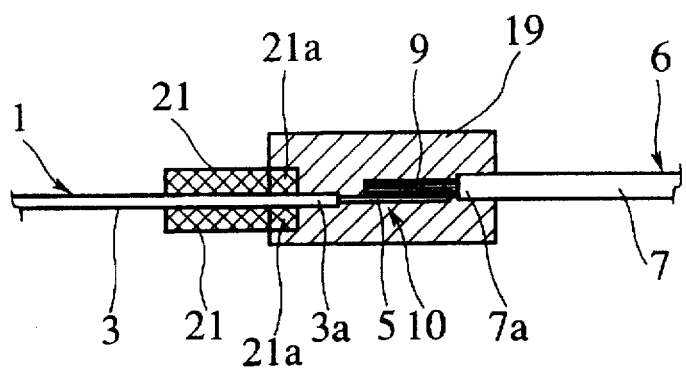
FIG. 2C is a lateral cross sectional view of the structure of FIG. 1, showing a condition of the structure after the conductors have been already connected to the conductors of the relay wires.

An embodiment of the present invention will be described with reference to the drawings. FIG. 1 is a perspective view of a protective structure of the embodiment and FIGS. 2A to 2C are respective lateral cross sectional views of the structure of FIG. 1, showing the structure under condition before connection in FIG. 2A, the structure in "insert" molding in FIG. 2B, and the structure after molding in FIG. 2C.

As shown in FIG. 1, a flat cable 1 consists of an insulating cover part 3 and a plurality of conductors 5 juxtaposed in the cover part 3. The protective structure includes the conductors 5 of which leading ends are exposed from the cover part 3 of the cable 1, bundles of conductors (wires) 9 of relay wires 6 as other conductive parts, a conductive connecting part 10 where the conductors 5 of the flat cable 1 are connected to the conductors 9 of the relay wires 6 by means of welding, a protective member 21 for enveloping the cover part 3 partially and an insulating member 19 formed by means of "insert" molding for covering the conductive connecting part 10 together with a leading end 21a of the protective member 21. Not only does the insulating member 19 cover the conductive connecting part 10 thereby protecting it, but also the member 19 serves to increase the tensile strength of the flat cable 1 per se.

A mold 11 for applying the above insert molding for the conductive connecting part 10 is composed of an upper molding die (part) 13 and a lower molding die (part) 15 defining a cavity 17 in which the part 10 is to be accommodated. The upper and lower molding dies 13 and 15 are provided at respective ends 13a, 15a thereof with a holding part (recesses) 23 for interposing the protective member 21 from the upper and lower sides in the direction of a thickness of the cover part 3 and a through part (recesses) 25 through which the cover part 3 of the flat cable 1 passes out of the mold 11. Further, the upper and lower molding dies 13, 15 are provided on respective other ends thereof with another holding parts (grooves) 27 for interposing respective peripheries of insulating cover parts 7 of the relay wires 6 in molding. On condition of adjusting the protective member 21 and the cover parts 7 to the holding part 23 and the holding part 27 respectively, when an intensive pressure is applied on the mold 11 from the upper and lower directions thereby to clamp the mold 11, the cavity 17 in the mold 11 can be sealed up tightly.

The protective member 21 is made of elastic or flexible resinous material and formed to have a thickness enough to protect the conductors 5 of the flat cable 1 when the mold 11 is clamped. The insulating member 19 is made of thermoplastic or thermosetting resinous material.

We now describe a protecting method in accordance with the embodiment of the invention.

First of all, the conductors 5 exposed from the cover part 3 of the flat cable 1 are respectively connected to the conductors 9 exposed from the cover parts 7 of the relay wires 6 by welding or the like, as shown in FIG. 2A. Both of the conductors 5 and the conductors 9 connected to each other in this way constitute the above connecting part 10 of the protective structure of the invention.

Secondly, the cover part 3 of the flat cable 1 is interposed by the protective member 21 from an outside of the part 3 in the direction of thickness. Then, the protective member 21 is positioned apart from the conductive connecting part 10 by a predetermined distance so that a tip 3a of the cover part 3 is exposed outside.

Next, as shown in FIG. 2B, upon adjusting the protective member 21 to the holding part 23 of the upper and lower molding dies 13, 15 while adjusting the cover parts 7 of the relay wires 6 on the holding parts 27, the upper and lower molding dies 13, 15 are clamped so as to join together under an intensive pressure. Thus, the conductive connecting part 10 can be accommodated in the cavity 17 of the mold 11 in a leak-tight manner. That is, under such a condition, the end 3a of the cover part 3 of the flat cable 1, the end 21a of the protective member 21, and the respective ends 7a of the cover parts 7 are accommodated in the cavity 17 of the mold 11 together.

Finally, the thermoplastic or thermosetting resinous material is charged into the cavity 17 of the mold 11, so that the insulating member 19 can be formed by this "insert" molding.

According to the embodiment, since the cover part 3 is not held by the mold 11 directly but held through the intermediary of the protective member 21 in forming the conductive connecting part 10 (i.e., the insert molding of the insulating member 19), it is possible to moderate a force applied on the conductors 5 by the aid of the protective member 21 without increasing a thickness of the cover part 3 of the flat cable 1, so that the breaking (disconnection) of the conductors 5 caused by an excessive shearing force in molding can be prevented certainly. In other words, it is possible to thin the cover part 3 of the flat cable 1 so as to improve movability of the cable 1, to prevent it from being large-sized, and to stabilize the connecting form of the cable 1.

Consequently, it is possible to maintain the performance of the flat cable 1 in a good condition. Further, the protective structure of the invention allows the conductive connecting part 10 to be protected with an increase in tensile strength, so that the reliability of the protective structure can be improved due to the stabilization in connecting form of the cable 1.

Finally, it will be understood by those skilled in the art that the foregoing description is one of preferred embodiments of the disclosed protective method and structure, and that various changes and modifications may be made to the present invention without departing from the spirit and scope thereof.

What is claimed is:

1. A method of protecting a conductive connecting part of a flat cable, at which said flat cable is electrically connected to an object, said flat cable comprising a conductor and an insulating cover part for enveloping a major portion of said conductor, said object including another conductor to be connected to said conductor of said flat cable, said method comprising the steps of:

connecting a portion of said conductor, not enveloped by said insulating cover part of said flat cable to said conductor of said object at said conductive connecting part;

arranging a protective member at an exterior of said insulating cover part in a direction of thickness of said insulating cover part;

interposing said protective member between opposing molding dies in the direction of thickness, and accommodating said conductive connecting part of said flat cable in a leak-tight manner in a cavity defined by said molding dies;

supplying insulating material in said cavity, thereby insert-molding an insulating member for enclosing said conductive connecting part; and wherein each of said molding dies is provided, on both sides of said cavity, with a recess for holding said protective member and a groove for holding said object, respectively.

2. The method of protecting as claimed in claim 1, wherein said connecting step comprises welding said conductor of said flat cable to said conductor of said object.

3. The method of protecting as claimed in claim 2, wherein said protective member is made of resinous material exhibiting one of elasticity and flexibility.

4. The method of protecting as claimed in claim 3, wherein said insulating material is one of thermoplastic resinous material and thermosetting resinous material.

5. A method of protecting as claimed in claim 1, wherein each of said molding dies is provided, adjacent to said recess, with another recess for passing said insulating cover part of said flat cable therethrough.

6. A method of protecting a conductive connecting part of a flat cable, at which said flat cable is electrically connected to an object, said flat cable comprising a conductor and an insulating cover part for enveloping a major portion of said conductor, said object including another conductor to be connected to said conductor of said flat cable, said method comprising the steps of:

connecting a portion of said conductor, not enveloped by said insulating cover part of said flat cable, to said conductor of said object at said conductive connecting part;

arranging a protective member at an exterior of said insulating cover part in a direction of thickness of said insulating cover part;

interposing said protective member between opposing molding dies in the direction of thickness, and accommodating said conductive connecting part of said flat cable in a leak-tight manner in a cavity defined by said molding dies;

supplying insulating material in said cavity, thereby insert-molding an insulating member for enclosing said conductive connecting part; and wherein each of said molding dies is provided, adjacent to a recess provided on both sides of the cavity, with another recess for passing said insulating cover part of said flat cable therethrough.

* * * * *

UNITED STATES PATENT AND TRADEMARK OFFICE
CERTIFICATE OF CORRECTION

PATENT NO. : 5,724,730
DATED : March 10, 1998
INVENTOR(S) : Yoshiyuki TANAKA

It is certified that error appears in the above-indentified patent and that said Letters Patent is hereby corrected as shown below:

Column 1, line 32: change "publication" to -- Publication --;

line 44: after "and", insert -- , --;

column 4, line 8: after "directions", insert --,--.

Signed and Sealed this

Sixteenth Day of June, 1998

Attest:

BRUCE LEHMAN

Attesting Officer      Commissioner of Patents and Trademarks